United States Patent [19]

Coley et al.

[11] Patent Number: 5,751,914
[45] Date of Patent: May 12, 1998

[54] METHOD AND SYSTEM FOR CORRELATING A PLURALITY OF EVENTS WITHIN A DATA PROCESSING SYSTEM

[75] Inventors: Brett Angus Coley, Raleigh; Vincent G. Chin, Cary; Patrick Francis Downing, Wake Forest; David M. Wormald, Cary, all of N.C.

[73] Assignee: International Business Machines Corporation, Armonk, N.Y.

[21] Appl. No.: 541,838

[22] Filed: Oct. 10, 1995

[51] Int. Cl.⁶ .................................... G06F 17/00
[52] U.S. Cl. ...................... 395/51; 395/75; 395/76
[58] Field of Search ....................... 395/12, 52, 51, 395/75, 76; 364/274.5, 972.5

[56] References Cited

U.S. PATENT DOCUMENTS

| | | | |
|---|---|---|---|
| 4,656,603 | 4/1987 | Dunn | 395/348 |
| 4,891,766 | 1/1990 | Derr et al. | 395/76 |
| 5,063,523 | 11/1991 | Vrenjak | 395/200.53 |
| 5,218,669 | 6/1993 | Kobayashi et al. | 395/51 |
| 5,283,856 | 2/1994 | Gross et al. | 395/51 |
| 5,388,189 | 2/1995 | Kung | 395/50 |
| 5,557,747 | 9/1996 | Rogers et al. | 395/200.53 |

Primary Examiner—Tariq R. Hafiz
Assistant Examiner—Jason W. Rhodes
Attorney, Agent, or Firm—John J. Timar

[57] ABSTRACT

A method and system are disclosed for efficiently correlating a plurality of events within a data processing system to determine an action to be performed. According to the present invention, a rule network is provided which includes a number of objects arranged in a tree structure having at least one parent object and a plurality of child objects, where a parent object is logically linked to a child object by passing an input event received by the parent object to the child object. At least one of the objects within the rule network invokes an action in response to receipt of a particular input event. In response to receipt of a series of events, the series of events is evaluated through the tree structure rule network. In response to the evaluation, an action is invoked at one of the number of objects. In a preferred embodiment of the present invention, the data processing system includes a display device and a graphical pointing device to enable the construction of the rule network by a user through a graphical user interface in which each object within the rule network is represented within the display device by a corresponding graphical object.

27 Claims, 9 Drawing Sheets

METHOD AND SYSTEM FOR CORRELATING A PLURALITY OF EVENTS WITHIN A DATA PROCESSING SYSTEM

BACKGROUND OF THE INVENTION

1. Technical Field

The present invention relates in general to a method and system for data processing and in particular to a method and system for correlating a plurality of events within a data processing system to determine an action to be performed. Still more particularly, the present invention relates to a method and system for correlating a plurality of events within a data processing system which evaluate the plurality of events with respect to a predetermined rule in order to determine an action to be performed.

2. Description of the Related Art

Within the field of data communication network management, rule-based management systems are commonly utilized to automatically process event messages. Such rule-based systems are generally implemented, via object-oriented programming techniques, within the context of a network management facility. The rules implemented by such network management systems typically follow the "if-then-else" paradigm. Thus, upon the occurrence of an event satisfying the criteria set forth in the "if" portion of the rule, such as the source of the event message matching a particular host name, the "then" portion of the rule will invoke a particular action. Conversely, if the event message does not satisfy the initial criteria of the rule, the actions specified within the "else" portion of the rule is invoked. In complex systems, multiple "if- then-else" sequences can be linked utilizing connectors and Boolean operators to construct relatively complex action sequences and action criteria.

One disadvantage of conventional rule-based network management systems is the inability of such systems to correlate multiple events to determine the action or actions which should be invoked. In order to address this problem, some network management systems have implemented sophisticated artificial intelligence (AI) inference engines which perform event correlation on the backend. AI inference engines typically require a knowledge base constructed in an AI language (e.g., PROLOG) that includes a sequence of predicate logic (if-then-else) statements. The AI inference engine correlates multiple events with an action by parsing and processing each of the predicate logic statements and then performing an indicated action. Because of the inherent complexity of such AI inference engines and AI programming in general, network engineers having a thorough knowledge of the network, but limited AI language programming experience, are unable to themselves design or customize an event correlation engine within the network management system.

Consequently, it would be desirable to provide an improved method and system for correlating a plurality of events within a data processing system to determine an action to be performed. In particular, it would be desirable to provide a graphical and intuitive method for constructing rules to correlate multiple events in order to determine an action or actions to be performed.

SUMMARY OF THE INVENTION

It is therefore one object of the present invention to provide an improved method and system for data processing.

It is another object of the present invention to provide an improved method and system for correlating a plurality of events within a data processing system to determine an action to be performed.

It is yet another object of the present invention to provide an improved method and system for correlating a plurality of events within a data processing system which evaluate the plurality of events with respect to a predetermined rule to determine an action to be performed.

The foregoing objects are achieved as is now described. A method and system are disclosed for efficiently correlating a plurality of events within a data processing system to determine an action to be performed. According to the present invention, a rule network is provided which includes a number of objects arranged in a tree structure having at least one parent object and a plurality of child objects, where a parent object is logically linked to a child object by passing an input event received by the parent object to the child object. At least one of the objects within the rule network invokes an action in response to receipt of a particular input event. In response to receipt of a series of events, the series of events is evaluated through the tree structure rule network. In response to the evaluation, an action is invoked at one of the number of objects. In a preferred embodiment of the present invention, the data processing system includes a display device and a graphical pointing device to enable the construction of the rule network by a user through a graphical user interface in which each object within the rule network is represented within the display device by a corresponding graphical object.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
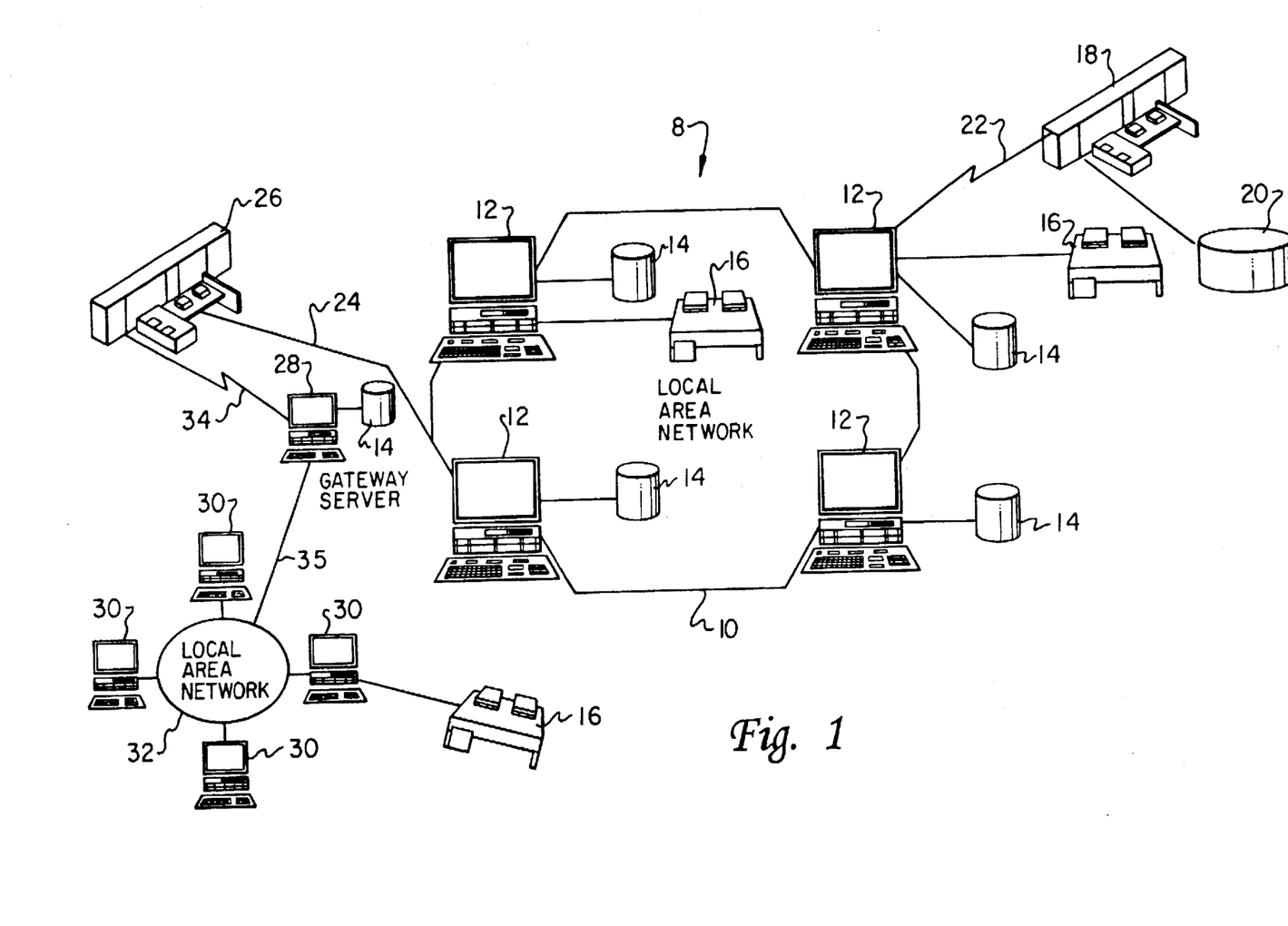
FIG. 1 illustrates a pictorial representation of a data processing system which may be utilized to implement the method and system of the present invention.

With reference now to the figures and in particular with reference to FIG. 1, there is illustrated a pictorial representation of a data processing system 8 which may be utilized to implement the method of the present invention. As illustrated, data processing system 8 contains a plurality of networks, including local area networks (LAN) 10 and 32, each of which preferably includes a plurality of individual computers 12 and 30, respectively. Those skilled in the art will appreciate that a plurality of workstations coupled to a host processor may be utilized for each such network. As is common in such data processing systems, each computer 12 and 30 may be coupled to a storage device 14 and a printer 16.

Data processing system 8 further includes one or more mainframe computers, such as mainframe computer 18, which may be preferably coupled to LAN 10 by means of a communication link 22. Mainframe computer 18 is preferably coupled to a storage device 20 which serves as remote storage for LAN 10. LAN 10 is also coupled via communications link 24 through communications controller 26 and communications link 34 to gateway server 28. Gateway server 28 is preferably a workstation which serves to link LAN 32 to LAN 10 via communications link 35. As will be understood by those skilled in the art, data processing system 8 additionally includes unillustrated gateways, routers, bridges, and various other network hardware utilized to interconnect the segments of data processing system 8.

Data processing system 8 utilizes one or more network communications protocols such as Transport Control Protocol/Interface Program (TCP/IP) to communicate information between various network nodes within data processing system 8. In addition, data processing system 8 preferably employs one or more network management protocols, such as Simple Network Management Protocol (SNMP) and CMIP CMIS, which run on top of the network communications protocol. Furthermore, to facilitate software sharing among the network nodes of data processing system 8, each of computers 12 and 30, gateway server 28, and mainframe computer 18 utilize a Remote Program Call (RPC) handshaking protocol to invoke software residing at a remote network node.

According to a preferred embodiment of the present invention, data processing system 8 is managed utilizing a network management platform running on gateway server 28, such as NetView™ available from International Business Machines Corporation. Utilizing the NetView™ network management platform, a system administrator can analyze the activity of each component of data processing system 8, thereby enabling the system administrator to troubleshoot detected problems and efficiently allocate system resources. In a preferred embodiment of the present invention in which data processing system 8 runs SNMP on top of TCP/IP, network events are communicated to the network management platform by SNMP traps, which each conform to a specified architected structure. According to the SNMP protocol, traps within data processing system 8 each include a unique enterprise ID that specifies the source object (hardware or software), a time stamp indicating when the event occurred, a specific trap number which identifies the event, and a variable binding area that contains specific event data.

Figure 2:
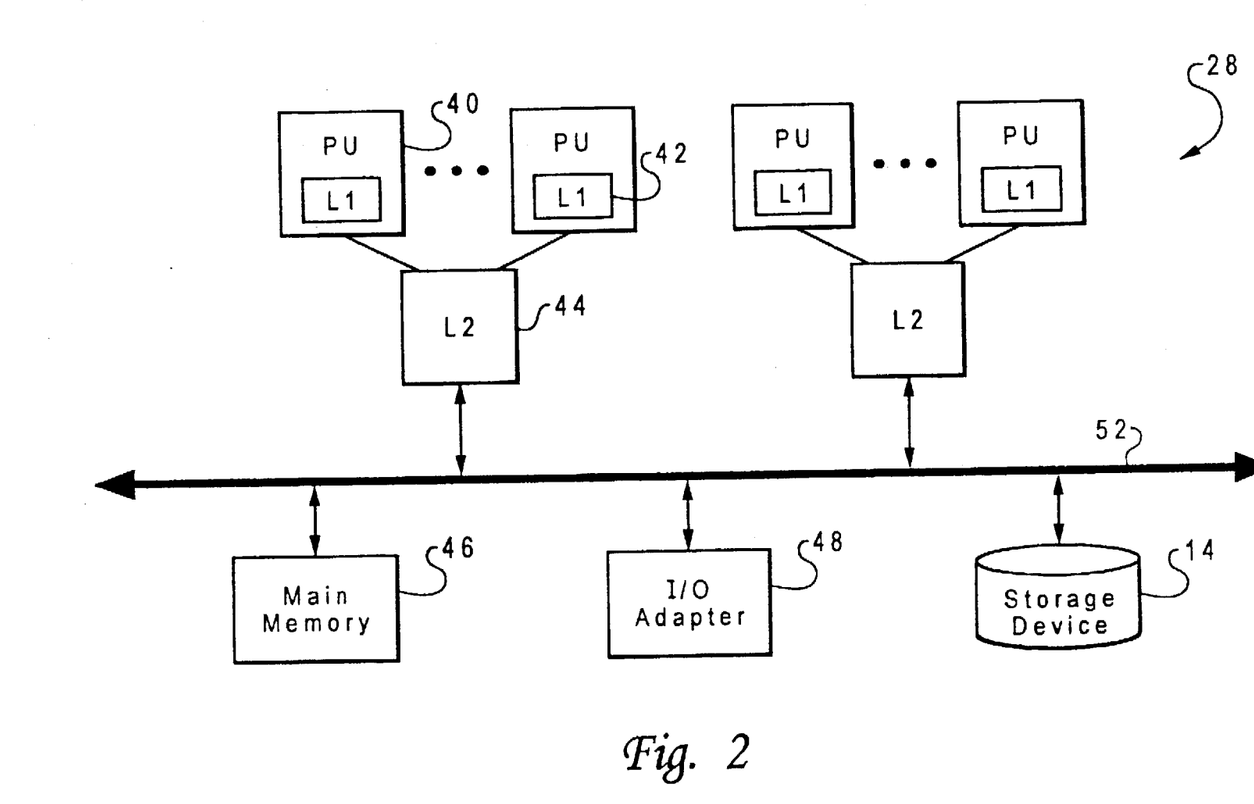
FIG. 2 depicts a block diagram of a preferred embodiment of a workstation which may be advantageously utilized to implement the method and system of the present invention.

Referring now to FIG. 2, there is depicted a block diagram of a preferred embodiment of the system unit of gateway server 28. As illustrated, gateway server 28 preferably comprises a multiprocessor computer such as the IBM RISC System/6000. Gateway server 28 includes a number of processing units (PUs) 40, which preferably run under a multitasking, multithreaded operating system such as AIX (Advanced Interactive Executive), the IBM version of UNIX. According to the present invention, PUs 40 also execute network management software utilized to manage data processing system 8. Gateway server 28 further includes a memory hierarchy, including level one (L1) caches 42, level two (L2) caches 44, and main memory 46. In addition, gateway server 28 includes input/output (I/O) adapter 48, which is coupled between system bus 52 and communications link 34 to facilitate data communication between gateway server 12 and other hardware components of data processing system 8. Finally, gateway server 28 is coupled to storage device 14, which provides nonvolatile storage for the operating system, the network management platform, and other applications utilized by gateway server 28. As will be appreciated by those skilled in the art, gateway server 28 includes additional devices which are not necessary for an understanding of the present invention and are accordingly omitted from FIG. 2 for the sake of simplicity.

Figure 3:
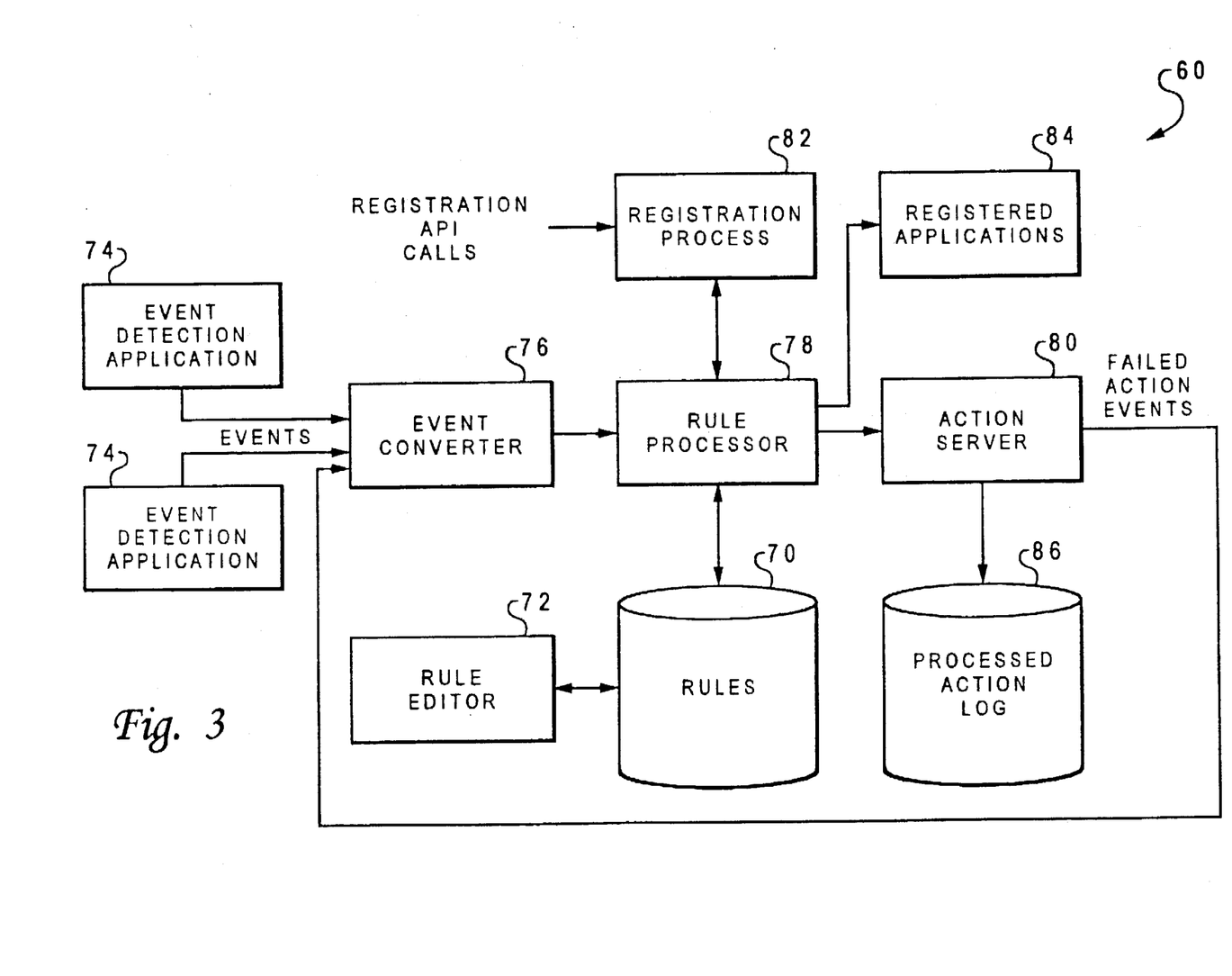
FIG. 3 illustrates a pictorial representation of a preferred embodiment of the correlation engine of the present invention within a network management system.

With reference now to FIG. 3, there is depicted a pictorial representation of the event correlation engine of the network management platform run by gateway server 28. To correlate multiple events, event correlation engine 60 implements one or more user-defined rules 70. According to an important aspect of the present invention, rules 70 do not have a conventional "if...then...else" (predicate logic) structure. In contrast to conventional rule processors, rule correlation engine 60 implements rules comprising a number of action and/or comparison nodes arranged in a tree structure. Each of the nodes within a rule is preferably implemented as a program object that performs the action and/or comparison associated with the node. By organizing each rule as a tree of comparison and action nodes, the correlation of disparate events and/or disparate attributes of events is made possible. As illustrated in FIG. 3, rules 70 are constructed utilizing rule editor 72, which in a preferred embodiment of the present invention comprises a graphic user interface (GUI) drawing tool with which a user may construct rules utilizing the familiar drag-and-drop technique.

Figure 4:
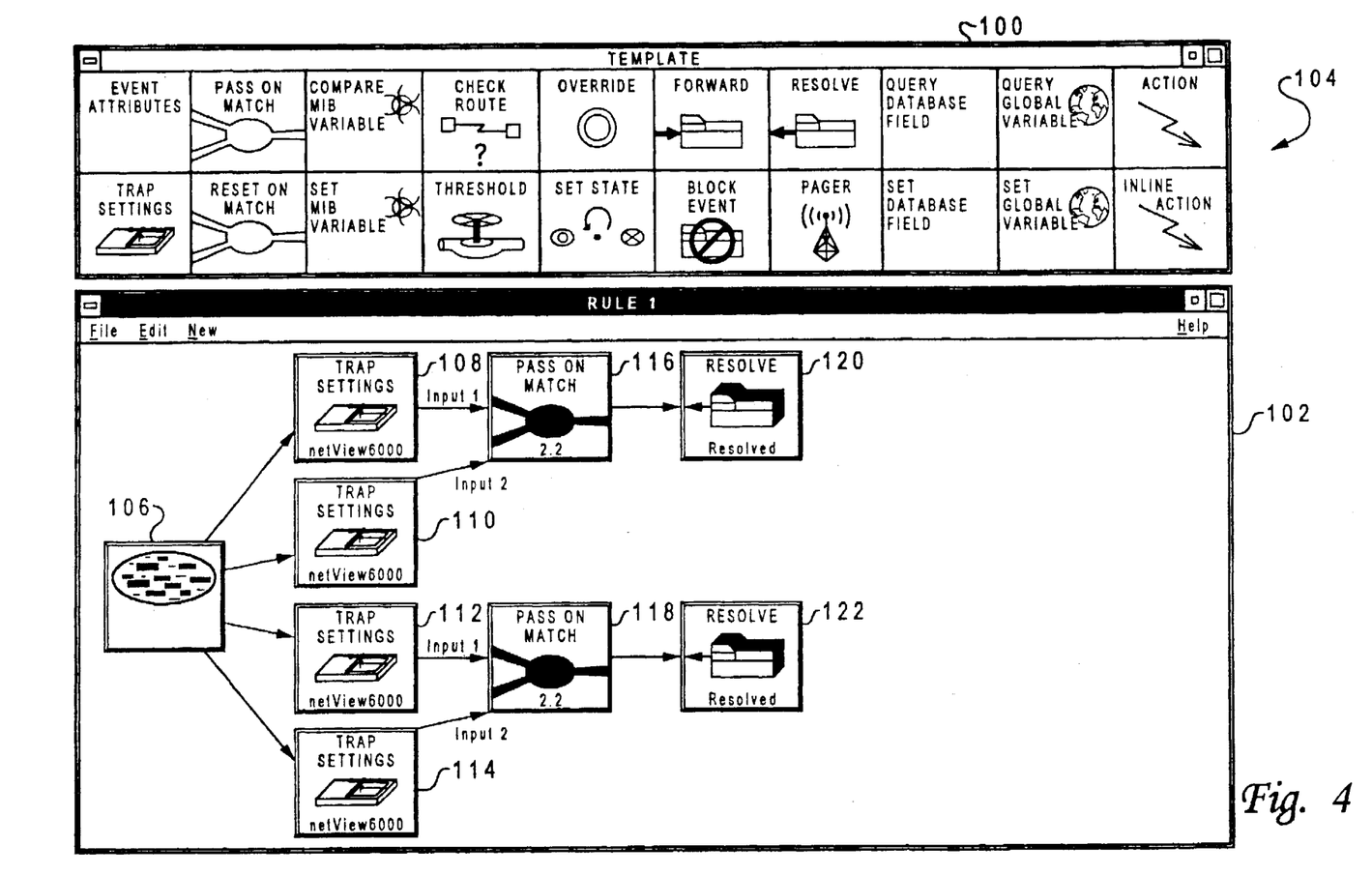
FIGS. 4 depicts a preferred embodiment of a graphical user interface utilized to construct a rule according to a preferred embodiment of the present invention.

Referring now to FIG. 4, there is depicted a preferred embodiment of a template and drawing window of rule editor 72 utilized by a user to construct a rule according to the present invention. As illustrated, rule editor 72 displays a template 100 and drawing window 102 to the user. To add a comparison or action node representative of a program object to a rule, the user simply selects a particular template icon 104, drags the selected template icon 104 into drawing window 102 and drops the selected template icon 104 at the desired location. A template icon 104 dropped within drawing window 102 is then displayed as one of nodes 108–122. As will be described in greater detail below, when a template icon 104 is dropped into drawing window 102, rule editor 72 displays a dialog box to the user which requests input that the program object associated with the node will require to perform its task. After the user has supplied the requested input, the user attaches the node to either network event node 106 or another node of the rule by drawing arrows connecting the node to other nodes in the desired sequence.

The comparison operation or action performed by the program object associated with each of template icons 104 will now be briefly described.

Event Attributes: Compares a single attribute or subset of an attribute of an event with a predetermined value. For example, if the event attribute of interest is a string, an event attributes node can be configured by the user to compare the second word within the string with a particular word.

Trap Settings: Specifies a trap or traps from an enterprise (hardware or software subsystem of data processing system 8) of interest to be evaluated within a branch of a rule. For example, utilizing the associated dialog boxes, a trap settings node can be configured to pass one or more SNMP V1 and V2 traps, CMIP CMIS events, and Remote Program Call (RPC) communications to the trap settings node's child node.

Pass On Match: Passes an event to a node downstream from itself (its child node) if the pass on match node's defined comparison operation results in a true evaluation. For example, if the defined comparison is a determination of whether the second variable binding of a SNMP V1 trap is greater than the first variable binding of a second SNMP V1 trap, a pass on match node passes the event of interest to a downstream node if the comparison is true.

Reset On Match: Blocks an event from being passed to downstream nodes if the defined comparison operation is true. Thus, if the defined comparison operation is a comparison between particular attributes of a first and a second event and the second event does not occur within a specified time period, the reset on match node acts as a delay for the first event.

Compare Management Information Block (MIB) Variable: Compares a specified attribute of an event with a retrieved SNMP variable.

Set MIB Variable: Sets a target SNMP MIB with a value. For example, since a SNMP Systems Monitor stores its execution control information within a MIB, a set MIB variable node enables the execution of the Systems Monitor to be dynamically altered based upon events within the system.

Check Route: If so configured, a check route node returns a true evaluation if a physical connection exists between particular network nodes. Alternatively, a check route node can be configured to return a true evaluation if a connection does not exist between particular network nodes.

Threshold: Passes an event to its child node if the specified threshold event conditions are satisfied. For example, a threshold node can be configured to pass every $n^{th}$ event, each event after the $n^{th}$ event, each event prior to the $n^{th}$ event, or only the $n^{th}$ event within a given time period. The default setting is to pass each event or attribute for each enterprise ID.

Override: Enables the dynamic alteration of the status and severity of traps in order to communicate messages to associated registered applications within the network.

Set State: Interacts with the network management platform database to attach fields to network objects. One of the database fields specifies a current state of the associated network object, while remaining database fields specify preceding states of the network object.

Forward: Passes an event to each registered application associated with the rule in response to receipt of the event.

Block Event: Marks a particular event as dirty to prevent the event from being passed to registered applications if the rule's default communication setting is set to Pass.

Resolve: Transmits an event to associated registered applications in conjunction with a resolution message. For example, a resolve message can be utilized by a registered application which displays network events to limit the displayed events to a reasonable number by removing events that are no longer of interest.

Pager: Issues a page message to a beeper indicating that a specific event or combination of events has been received. The page message can include data specific to the triggering event(s) within the page message. A pager node can therefore provide an automated alert to a system analyst, network administrator, or other interested party.

Query Database Field: Fetches a particular field from the network management platform database and compares the field to a specified value.

Set Database Field: Sets a field within the network management platform database to a particular value.

Query Global Variable: Fetches by name an arbitrary variable utilized during rule processing and compares the arbitrary variable with a specified value.

Set Global Variable: Sets variable name utilized during rule processing to a specified value.

Action: Passes a specified executable command to action server 80 of FIG. 3. Failure of an action to complete execution successfully generates a failed action event.

Inline Action: Specifies a particular action to be executed inline by rule processor 78. Upon completion of the specified action, the exit code of the action is examined to determine whether processing down the branch of the rule should be continued. For example, an inline action node enables a user to specify a wait time which halts processing along that branch of the rule if the inline action is not performed within the specified wait time.

Figure 5:
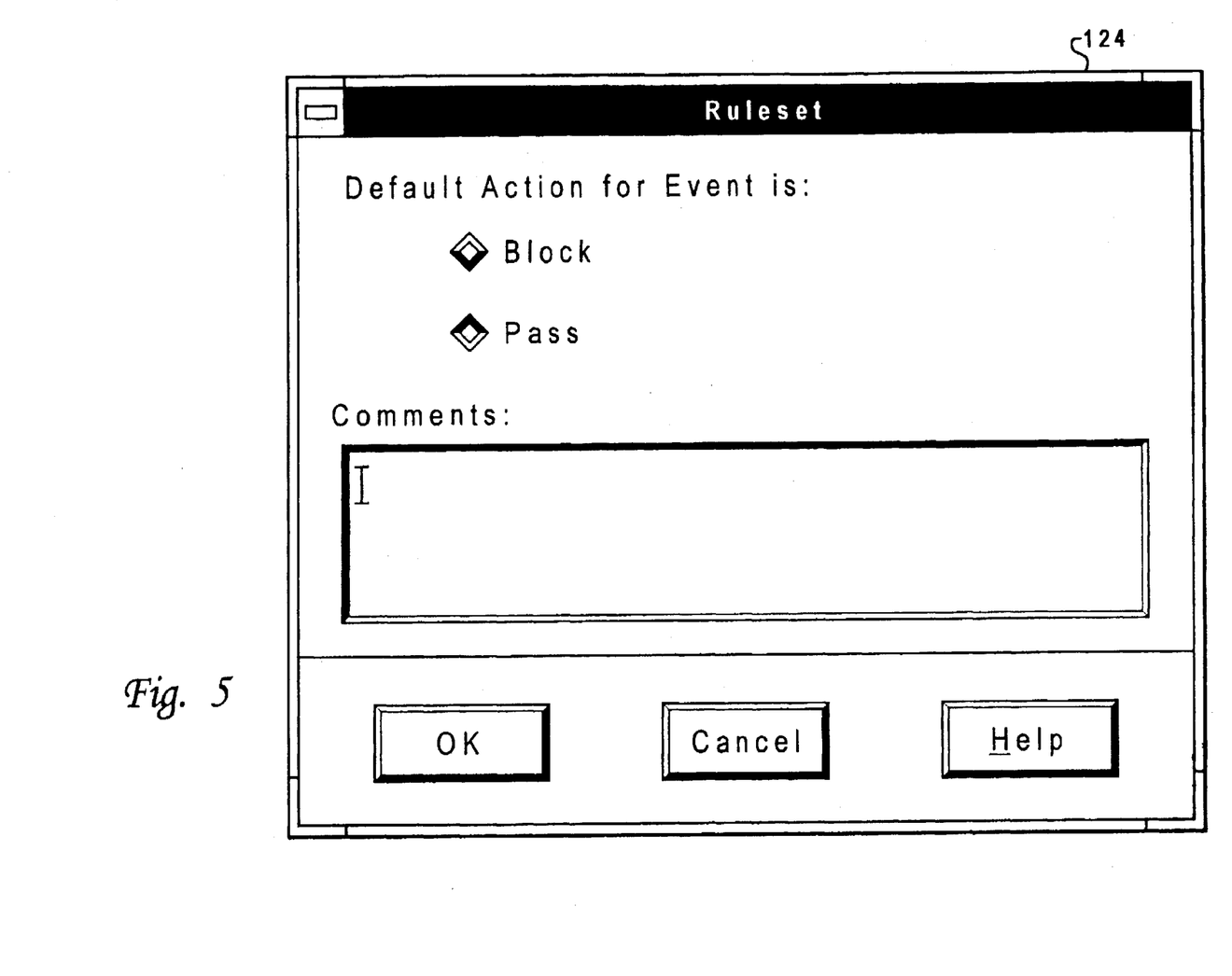
FIG. 5 illustrates a rule set dialog box utilized in a preferred embodiment of the present invention to set the default action for communicating events from a rule to registered application associated the rule.

Utilizing the above-described template icons 104, a user may construct the simple rule illustrated within display window 102. When rule editor 72 is first invoked, display window 102 contains only network event node 106. In response to the user double-clicking on network event node 106, rule editor 72 displays Ruleset dialog box 124 illustrated in FIG. 5, which prompts the user to select either the Block or Pass default communication setting for the rule. If a user selects Block, an event processed by the rule will be passed to registered applications associated with the rule only if the event is processed at a forward, override, or resolve node. Thus, a Block default communication setting is advantageously selected when a relatively few number of events are of interest to the registered applications associated with the rule. In contrast, if a default communication setting of Pass is selected, as illustrated in FIG. 5, after an event is processed within the rule, the event will be passed to registered applications associated with the rule unless the event is dirty (or has already been sent to the registered applications by a resolve, override, or forward node). As described above, an event is marked as dirty if the event was the catalyst which caused another event to be passed to a forward, resolve, or override node or if the event has hit a block node.

Figure 6:
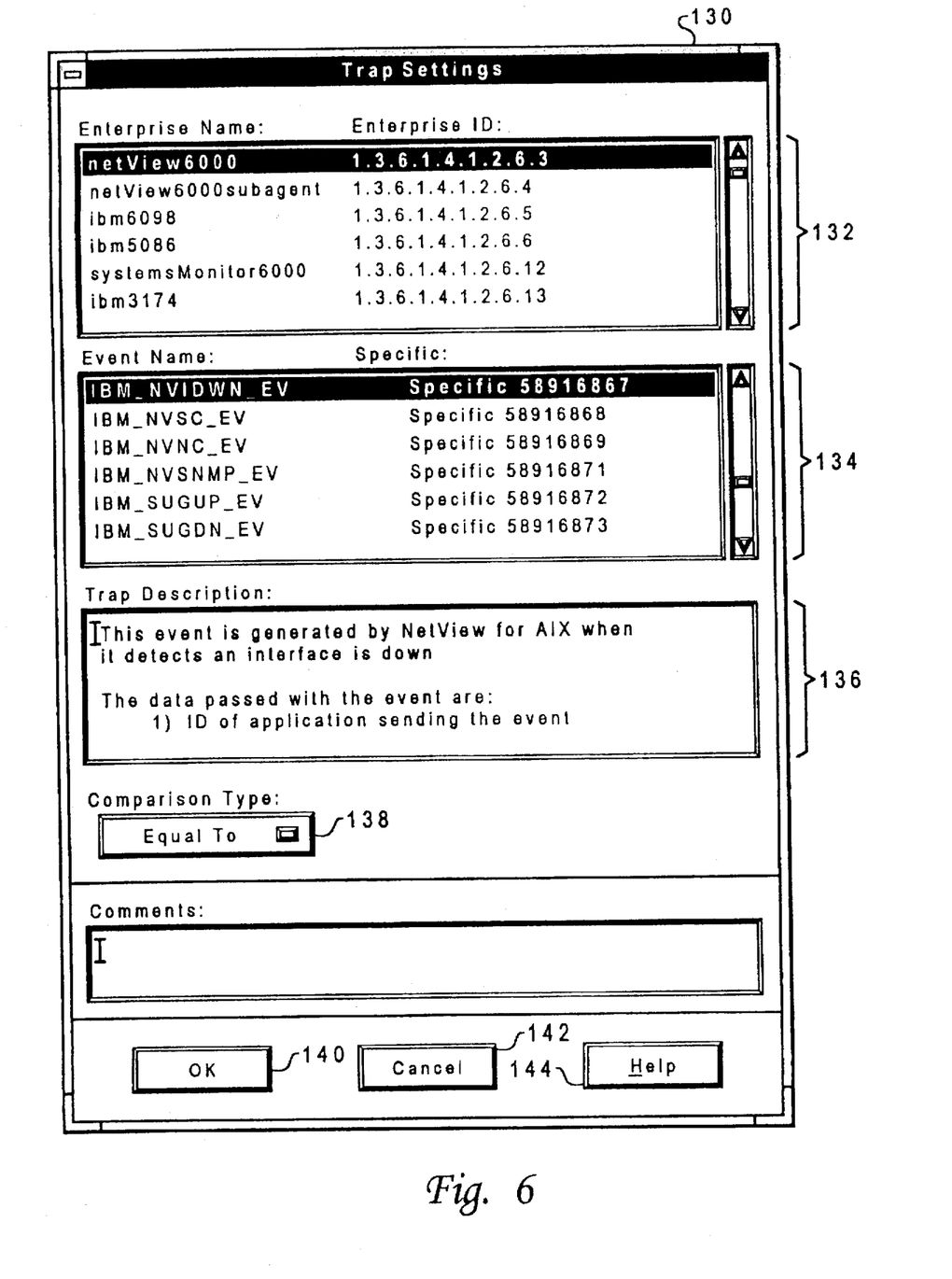
FIG. 6 depicts a trap settings dialog box utilized in a preferred embodiment of the present invention to specify a first event of interest to a particular enterprise.

Referring now to FIG. 6, Trap Settings dialog box 130 depicted in FIG. 6 is displayed to the user in response to the user adding trap settings node 108 to drawing window 102. When Trap Settings dialog box 130 is first displayed, enterprise field 132 lists all enterprises attached to data processing system 8 by enterprise name and enterprise ID. As mentioned above, an enterprise ID is a universal designation utilized by hardware and software vendors to identify network objects within SNMP. Once a user has selected a particular enterprise by highlighting the enterprise name and enterprise ID, for example, netView6000, the available events for the selected enterprise are displayed within event field 134. The user then selects one or more of the defined events for the selected enterprise by highlighting the particular event(s). A user is assisted in selecting a desired event by the associated trap description displayed within description field 136. The user then defines the comparison operation performed by node 108 for the selected events by manipulating comparison type button 138 with a graphical pointer. For example, the user can select between various comparison operations, including equal to, not equal to, greater than, less than, greater than or equal to, and less than or equal to. Finally, the user confirms or cancels the selections made within trap settings dialog box 130 by pressing OK button 140 or cancel button 142, respectively. Alternatively, the user can request on-line help by selecting help button 144. The provision of a user-friendly GUI and an online help utility by rule editor 72 enables a user having only a limited understanding of programming, but a basic understanding of data processing system 8, to utilize event correlation engine 60 to manage data processing system 8.

Figure 7:
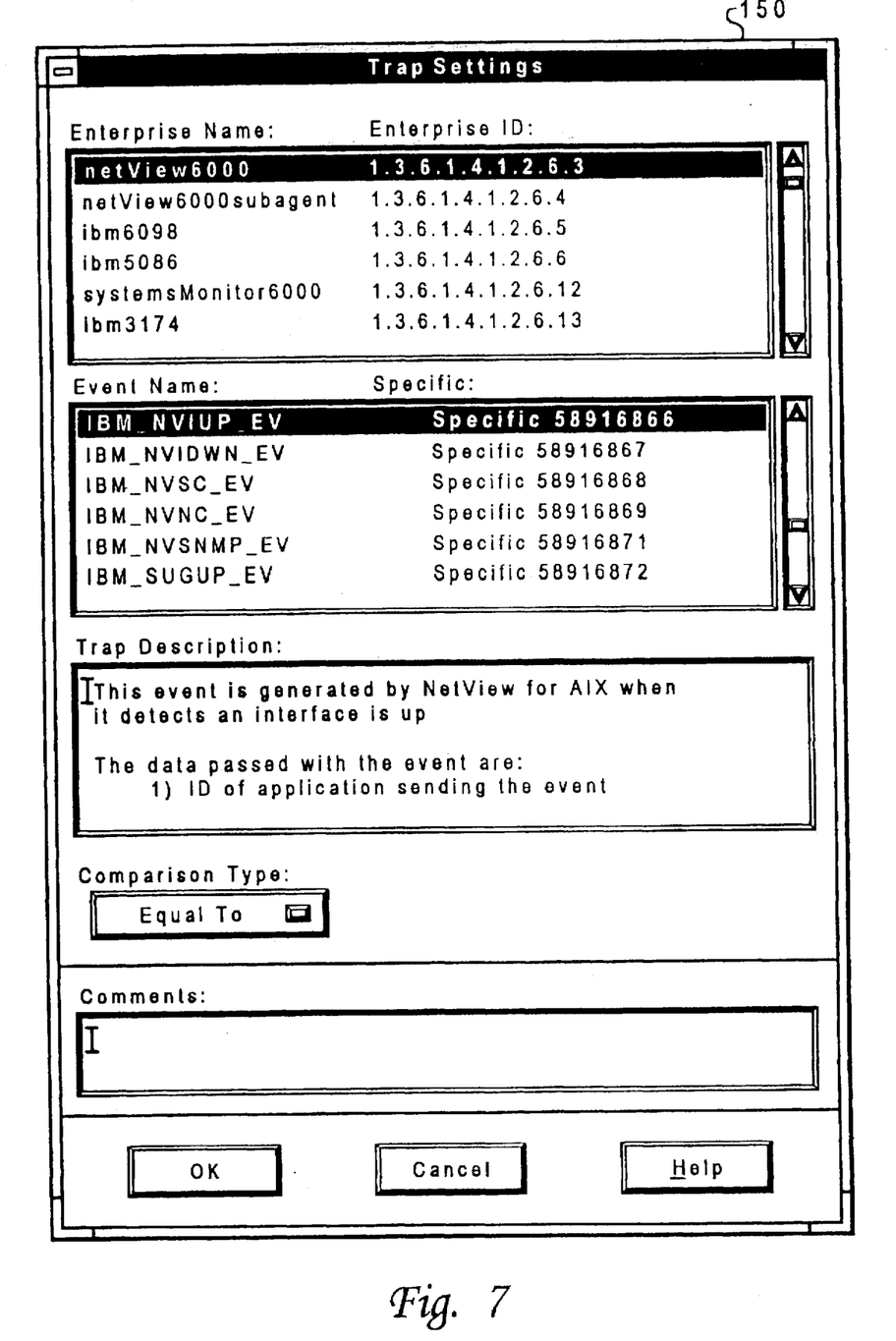
FIG. 7 illustrates a trap settings dialog box utilized in a preferred embodiment of the present invention to specify a second event of interest to a particular enterprise.

Referring again to FIG. 4, following the addition of node 108 to the rule displayed within display window 102, the user may drop the trap settings template icon into display window 102 to create trap settings node 110. In response to the addition of trap settings node 110, trap settings dialog box 150 of FIG. 7 is displayed to the user. As illustrated in FIG. 7, the selected enterprise, event, and comparison type specify that an event is passed to the child node of trap settings node 110 in response to the receipt of an event indicating that a particular interface is up (IBM_NVIUP_EV). Returning to FIG. 4, the user thereafter adds trap settings nodes 112 and 114 to the rule. In the exemplary rule depicted in FIG. 4, trap settings node 112 passes an event to a child node when a specified network node is "down" or disconnected from data processing system 8. Conversely, trap settings node 114 passes an event to a child node when a particular network node of data processing system 8 is "up" or attached to data processing system 8.

Figure 8:
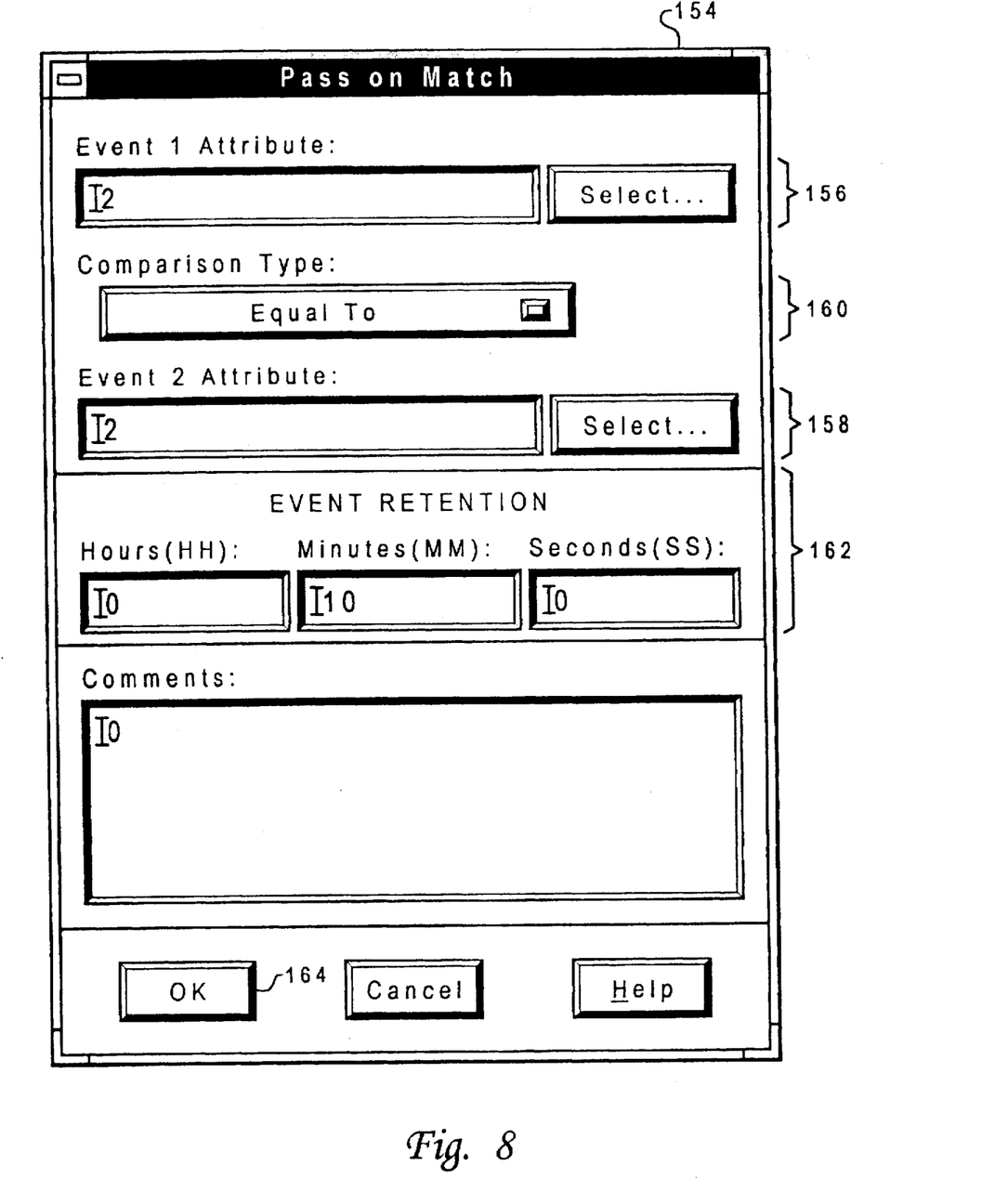
FIG. 8 depicts a pass on match dialog box utilized in a preferred embodiment of the present invention to define the comparison between two events performed at a particular node of a rule.

Referring now to FIG. 8, when each of pass on match nodes 116 and 118 is dropped into drawing window 102, a pass on match dialog box 154 is displayed to the user. As illustrated, a user selects the variable binding (i.e., attribute) of interest of the two input events of each of pass on match nodes 116 and 118 by entering the variable binding number within event attribute fields 156 and 158. The designation of the input events as events 1 and 2 is order sensitive in that if event 1 is received prior to event 2, event 1 will be held by the pass on match node until the expiration of the event retention period specified within event retention field 162. However, if event 2 is received at the pass on match node prior to event 1, event 2 is discarded. The user also specifies the comparison operation to be performed by each of pass on match nodes 116 and 118 by manipulating comparison type button 160. Thereafter, the user confirms the data entered in pass on match dialog box 154 by selecting OK button 164. As illustrated within pass on match nodes 116 and 118 of FIG. 4, each of pass on match nodes 116 and 118 is configured to compare the second variable binding of each of its two input events.

Referring again to FIG. 4, the rule also includes resolve nodes 120 and 122, which as described above, transmit internal event objects received at the resolve nodes to registered applications associated with the rule in conjunction with a resolution message. Following the construction of the rule within drawing window 102 according to the method hereinbefore described, the rule is titled (e.g., Rule 1) and stored within main memory 46 or storage device 14 as one of rules 70.

Figure 9:
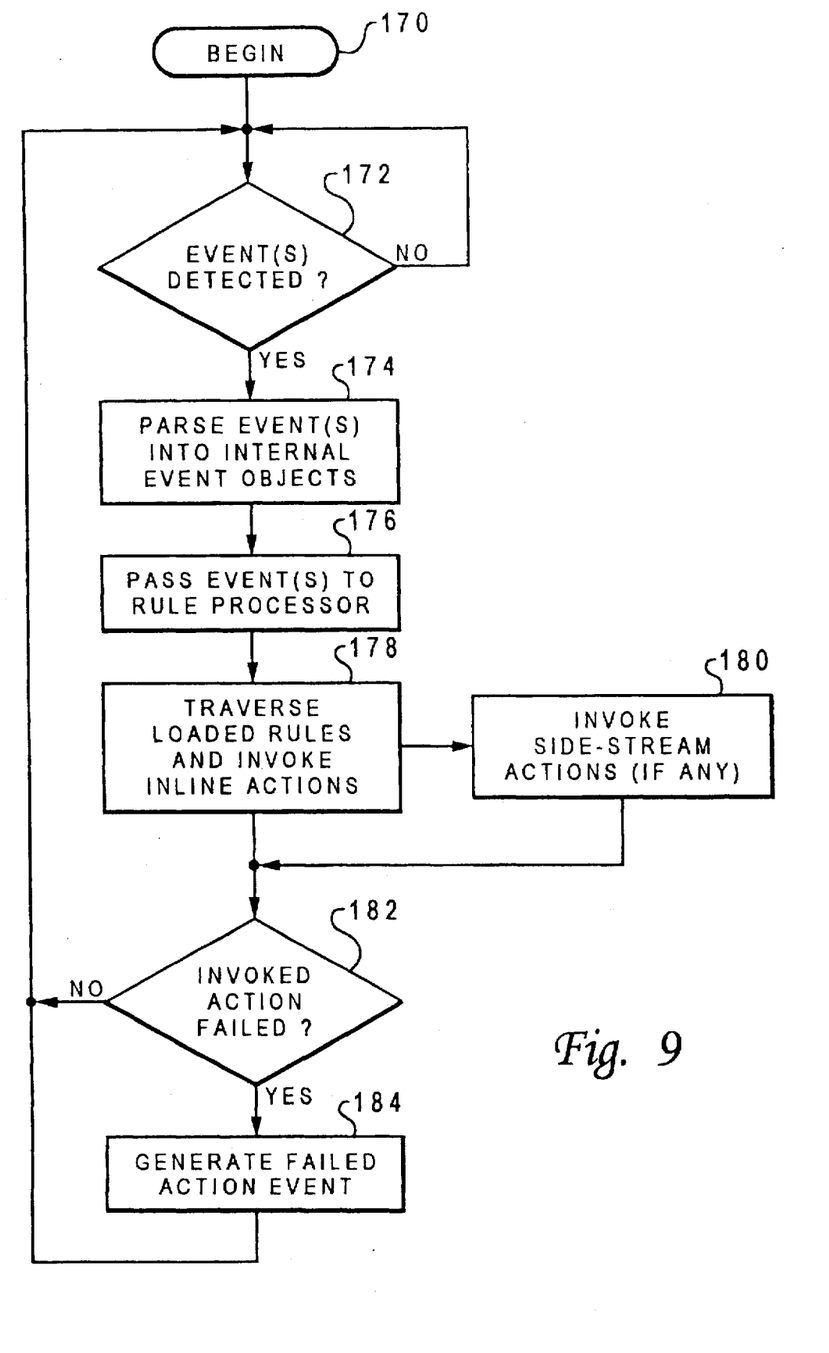
FIG. 9 is a flowchart illustrating a method of correlating events to determine an action to be performed according to a preferred embodiment of the present invention.

With reference now to FIG. 9, there is illustrated a preferred embodiment of a flowchart utilized by event correlation engine 60 of FIG. 3 to process events within data processing system 8. As will be appreciated by those skilled in the art, although the flowchart illustrated in FIG. 9 is sequential in structure, the steps illustrated therein are implemented by object-oriented software which performs many of the illustrated actions in parallel. As the process begins at block 170, event detection applications 74, which in a preferred embodiment of the present invention comprise network "listening" programs such as Trap d available from IBM Corporation, monitor network traffic within communications links 34 and 35 in order to detect events within data processing system 8. The process proceeds from block 170 to block 172, which illustrates determining whether any events, for example, SNMP traps, CMIP CMIS events, or RPC communications, have been detected. If not, the process loops at block 172 until an event is detected. In response to the detection of an event, event detection applications 74 forward the detected event to event converter 76. The process then proceeds from block 172 to block 174, which illustrates event converter 76 parsing each detected event into an internal event object, which comprises a uniform data structure that describes the detected event. For example, event converter 76 receives SNMP V1 and V2 traps, CMIP CMIS events, and RPC communications and maps each event type into a standard internal event object format. Event converter 76 then passes the internal event object to rule processor 78 as depicted at block 176.

As illustrated within FIG. 3, rule processor 78 is linked to registration process 82, which registers an application object with network correlation engine 60 in response to receiving a registration Application Programming Interface (API) call from the registering application. An example of a registered application 84 is an application which displays a graphical representation of the topology of data processing system 8 to enable a system administrator to easily identify each node attached to data processing system 8. By default each of registered applications 84 is associated with the default ruleset "forward all," which specifies that rule processor 78 is to notify that application of all internal event objects. However, each of registered applications 84 can limit the number of event messages it receives by designating one or more associated rules 70 within its registration API call. In order to minimize the storage within the memory hierarchy of gateway server 28 required to store the rules 70 associated with registered applications 84, program objects associated with nodes within multiple rules 70 are shared.

Referring now to FIGS. 3, 4, and 9, rule processor 78 utilizes the internal event object received from event convertor 76 to traverse each rule associated with each of registered applications 84. In a preferred embodiment of the present invention, rule processor 78 begins traversing a rule by passing the internal event object to a first child node connected to the network event node 106 of the rule. If the comparison or inline action performed by the program object associated with the first child node returns a true evaluation or if the node is an action node, the first child node passes the internal event object to the adjacent node within the first child node's subtree. Processing continues in this fashion until each branch of the first child node's subtree has processed the internal event object. Thereafter, the internal event object is sequentially processed through each remaining branch of the rule. After an internal event object is processed through every branch of a rule, the internal event object is passed back to the network event node 106. If the default communication setting of the rule is Pass, network event node 106 passes the internal event object to each associated registered application 84 if the event is not dirty and has not already been sent. In contrast, if the default communication setting of the rule is set to Block, the event is discarded without notifying registered applications 84. Rule processor 78 processes every rule associated with each of registered applications 84 in this manner until all loaded rules are processed.

As indicated at block 178, if rule processor 78 encounters an inline action node, rule processor 78 performs the specified inline action during rule processing. However, because performing inline actions can slow event correlation engine 60 considerably, action server 80 is also provided to perform actions specified by action nodes side-stream to rule processing, as illustrated at block 180 of FIG. 9. As depicted at block 182, following the completion of an action invoked by action server 80, action server 80 examines the return code of the action to determine whether the action successfully completed or failed. If action server 80 receives a non-zero return code, indicating that the action failed, the process passes from block 182 to block 184, which depicts action server 80 generating a failed action event and transmitting the failed action event to event converter 76 for further correlation and automation. However, if a determination is made that the invoked action completed successfully, the process returns to block 172, which illustrates event converter 76 awaiting further events. As depicted in FIG. 3, in order to record actions performed side-stream to rule processor 78, action server 80 logs actions and their outcomes within processed action log 86.

Referring again to FIG. 4, an exemplary rule processing scenario will now be described with reference to "Rule 1" depicted within display window 102. Although for simplicity the following description refers to the processing of events by nodes 106–122 of Rule 1, those skilled in the art will appreciate that event processing is actually performed by individual program objects associated with each of nodes 106–122.

Upon receipt of a first internal event object from event converter 76, rule processor 78 passes the internal event object to trap settings node 108. Assuming that the first event is a netView6000 IBM_NVIDWN_EV (interface down) event as specified within trap settings dialog box 130 of FIG. 6, trap settings node 108 passes the interface down internal event object to pass on match node 116. Upon receipt of the interface down internal event object, pass on match node 116 places an interface down internal event object within its event queue and awaits a second "matching" internal event object, namely the interface up internal event object specified within trap settings dialog box 150 of FIG. 7. Meanwhile, pass on match node 116 passes the interface down internal event object back to network event node 106, which sequentially passes the interface down internal event object to each of nodes 110–114 for processing by each of the other branches of Rule 1. Since each of nodes 110–114 returns a false evaluation, the interface down internal event object is eventually returned to network event node 106. Network event node 106 then forwards the interface down internal event object to each of registered applications 84 (if the default communication setting of Rule 1 is set to Pass). Consequently, each registered application 84 which receives the interface down internal event object "knows" that a particular network interface has gone down and has not been restored within the event retention period.

In response to receipt of an interface up internal event object from rule processor 78, network event node 106 passes the interface up internal event object to trap settings node 108. Because the interface up internal event object is not an interface down internal event object, trap settings node 108 returns a false evaluation and returns the interface up internal event object to network event node 106, which then passes the interface up internal event object to trap settings node 110. The interface up internal event object then receives a positive evaluation by trap settings node 110 and is passed to pass on match node 116. If pass on match node 116 receives the interface up internal event object within the event retention period specified within event retention field 162 of FIG. 8, pass on match node 116 passes the interface down internal event object to resolve node 120. As described above, resolve node 120 then transmits the interface down internal event object and a resolution message to each of registered applications 84 associated with Rule 1. Thus, each of registered applications 84 is notified that a particular network interface went down and was restored within the event retention period. However, if an interface up internal event object is not received by pass on match node 116 within the event retention period entered within event retention field 162, the interface down internal event object does not step forward to resolve node 120 and is discarded.

Following receipt of an interface up internal event object at pass on match node 116, processing of the interface up internal event object through Rule 1 continues. Because the interface up internal event object was the catalyst for the resolution of the interface down internal event object, the interface up internal event object is marked as dirty by pass on match node 116 and returned to network event node 106. Network event node 106 then sequentially passes the interface up internal event object to each of its remaining child nodes, which each render a false evaluation and return the interface up internal event object to network event node 106. Regardless of the default communication setting for Rule 1, network event node 106 discards the interface up internal event object without passing it to the registered applications 84 associated with Rule 1 because the interface up internal event object is dirty. It is important to note that a Block default communication setting would make little sense in Rule 1 because Rule 1 contains no forward or override nodes. Thus, if a default communication setting of Block were selected, registered applications 84 associated with Rule 1 would be notified only of resolved events, which are typically discarded by network applications.

As has been described, the present invention provides an improved method and system for correlating a plurality of event within a data processing system with one or more actions. According to a first aspect of the present invention, a user graphically and intuitively constructs one or rules which correlate multiple events with one or more actions utilizing a GUI rule editor. According to a second aspect of the present invention, a rule processor passes events for processing to each rule associated with each registered application within the data processing system. According to a third aspect of the present invention, particular actions encountered while processing an event through a rule can be passed to a rule server for execution side-stream to rule processing.

While the invention has been particularly shown and described with reference to a preferred embodiment, it will be understood by those skilled in the art that various changes in form and detail may be made therein without departing from the spirit and scope of the invention.

What is claimed is:

1. A method within a data processing system for correlating a plurality of events to determine an action to be performed, said method comprising:

providing a plurality of rule networks, each of said plurality of rule networks including a plurality of program objects arranged in a tree structure having at least one parent program object and a plurality of child program objects, wherein said at least one parent program object is logically linked to said plurality of child program objects by passing input events received by said at least one parent program object to said plurality of child program objects, wherein at least one of said plurality of program objects invokes an action in response to receipt of a particular input event;

in response to two rule networks among said plurality of rule networks both including identical program objects, minimizing said plurality of rule networks by sharing one of said identical program objects between said two rule networks;

registering at a first application program with a rule processor that passes events within said data processing system to particular rule networks among a plurality of rule networks, wherein said first application program has associated therewith one or more of said plurality of rule networks;

in response to receipt of said series of events at said rule processor, passing said series of events to each rule network associated with said first registered application program;

in response to receipt of said series of events by one of said one or more associated rule networks, evaluating said series of events through said tree structure; and in response to said evaluation, invoking an action at one of said plurality of program objects, wherein event correlation efficiency is enhanced.

2. The method for correlating a plurality of events of claim 1, said data processing system including a display device and a graphical pointing device, wherein said step of providing a plurality of rule networks comprises constructing a first rule network among said plurality of rule networks utilizing a graphical user interface, wherein each program object within said first rule network is represented within said display device by a corresponding graphical object.

3. The method for correlating a plurality of events of claim 1, each rule network including one root parent program object which is logically linked only to child program objects, said step of evaluating said series of events through said tree structure network comprising:

passing each event within said series of events from said root parent program object to a child program object of said root parent program object; and in response to a true evaluation of said event at said child program object, passing said each event through each branch of a subtree of said child program object until a false evaluation is reached.

4. The method for correlating a plurality of events of claim 3, and further comprising:

thereafter, performing said step of passing each event within said series of events to a child program object of said root parent program object and said step of passing said each event through each branch of a subtree of said child program object sequentially for each child program object of said root parent program object.

5. The method for correlating a plurality of events of claim 1, said method further comprising:

prior to said evaluation, parsing said series of events into a uniform event format utilized by said plurality of program objects within said rule network.

6. The method for correlating a plurality of events of claim 1, wherein said series of events includes an indication of a detection of a particular hardware state within said data processing system.

7. The method for correlating a plurality of events of claim 1, said data processing system comprising a data communication network that includes a plurality of hardware components including a host computer, wherein said series of events is received at said host computer and at least one of said series of events indicates a detection of a particular hardware state of a remote hardware component of said data communication network.

8. The method for correlating a plurality of events of claim 1, wherein said series of events includes an indication of a failure of a previously invoked action.

9. The method for correlating a plurality of events of claim 1, wherein said step of invoking an action comprises invoking a plurality of actions at one or more of said plurality of program objects within one of said plurality of rule networks.

10. The method for correlating a plurality of events of claim 1, said data processing system further including an action server, said method further comprising:

in response to said invocation of an action at one of said plurality of program objects, performing said action utilizing said action server if said program object specifies that said action is to be performed in parallel with said evaluation of said series of events within said each rule network associated with said at least one registered application program.

11. A computer program product within a computer readable media for causing a data processing system to correlate a plurality of events to determine an action to be performed, said computer program product comprising:

instruction means for causing said data processing system to permit provision of a plurality of rule networks, each of said plurality of rule networks including a plurality of program objects arranged in a tree structure having at least one parent program object and a plurality of child program objects, wherein said at least one parent program object is logically linked to said plurality of child program objects by passing input events received by said at least one parent program object to said plurality of child program objects, wherein at least one of said plurality of program objects invokes an action in response to receiving a particular input event;

instruction means, responsive to two rule networks among said plurality of rule networks both including identical program objects, for causing said data processing system to minimize said plurality of rule networks by sharing one of said identical program objects between said two rule networks;

instruction means for causing said data processing system to register at a first application program with a rule processor that passes events within said data processing system to particular rule networks among a plurality of rule networks, wherein said first application program has associated therewith one or more of said plurality of rule networks;

instruction means, responsive to receipt of said series of events at said rule processor, for causing said data processing system to pass said series of events to each rule network associated with said first registered application program;

instruction means, responsive to receipt of said series of events by one of said one or more associated rule networks, for causing said data processing system to evaluate said series of events through said tree structure; and instruction means, responsive to said evaluation, for causing said data processing system to invoke an action at one of said plurality of program objects, wherein event correlation efficiency is enhanced.

12. The computer program product of claim 11, said data processing system including a display device and a graphical pointing device, wherein said instruction means for causing said data processing system to permit provision of a plurality of rule networks comprises instruction means that enable a user of said data processing system to construct a first rule network among said plurality of rule networks utilizing a graphical user interface, wherein each program object within said first rule network is represented within said display device by a corresponding graphical object.

13. The computer program product of claim 11, each rule network including one root parent program object which is logically linked only to child program objects, said instruction means for causing said data processing system to evaluate said series of events through said tree structure network comprising:

instruction means for causing said data processing system to pass each event within said series of events from said root parent program object to a child program object of said root parent program object; and instruction means, responsive to a true evaluation of said event at said child program object, for passing said each event through each branch of a subtree of said child program object until a false evaluation is reached.

14. The computer program product of claim 13, and further comprising:

instruction means for causing said data processing system to thereafter pass each event within said series of events to a child program object of said root parent program object and pass said each event through each branch of a subtree of said child program object sequentially for each child program object of said root parent program object.

15. The computer program product of claim 11, and further comprising:

instruction means for causing said data processing system, prior to said evaluation, to parse said series of events into a uniform event format utilized by said plurality of program objects.

16. The computer program product of claim 11, wherein said instruction means for causing said data processing system to invoke an action comprises instruction means for causing said data processing system to invoke a plurality of actions at one or more of said plurality of program objects.

17. The computer program product of claim 11, said data processing system further including an action server, said computer program product further comprising:

instruction means, responsive to said invocation of an action at one of said plurality of program objects, for causing said data processing system to perform said action utilizing said action server if said program object specifies that said action is to be performed in parallel with said evaluation of said series of events within said each rule network associated with said at least one registered application program.

18. A system for correlating a plurality of events within a data processing system to determine an action to be performed, said system comprising;

means for providing a plurality of rule networks, each of said plurality of rule networks including a plurality of program objects arranged in a tree structure having at least one parent program object and a plurality of child program objects, wherein said at least one parent program object is logically linked to said plurality of child program objects by passing input events received by said at least one parent program object to said plurality of child program objects, wherein at least one of said plurality of program objects invokes an action in response to receiving a particular input event;

means, responsive to two rule networks among said plurality of rule networks both including identical program objects, for minimizing said plurality of rule networks by sharing one of said identical program objects;

means for registering at least a first application program with a rule processor that passes events within said data processing system to particular rule networks among said plurality of rule networks, wherein said first application program has associated therewith one or more of said plurality of rule networks;

means, responsive to receipt of said series of events at a rule processor, for passing said series of events to each rule network associated with said first registered application program;

means, responsive to receipt of said series of events by one of said one or more associated rule networks, for evaluating said series of events through said tree structure; and means, responsive to said evaluation, for invoking an action at one of said plurality of program objects, wherein event correlation efficiency is enhanced.

19. The system for correlating a plurality of events of claim 18, said data processing system including a display device and a graphical pointing device, wherein said means for providing a plurality of rule networks comprises means for constructing a first rule network among said plurality of rule networks utilizing a graphical user interface, wherein each program object within said first rule network is represented within said display device by a corresponding graphical object.

20. The system for correlating a plurality of events of claim 18, each rule network including one root parent program object which is logically linked only to child program objects, said means for evaluating said series of events through said tree structure network comprising:

means for passing each event within said series of events from said root parent program object to a child program object of said root parent program object; and means, responsive to a true evaluation of said event at said child program object, for passing said each event through each branch of a subtree of said child program object until a false evaluation is reached.

21. The system for correlating a plurality of events of claim 20, and further comprising:

means for thereafter passing each event within said series of events to a child program object of said root parent program object and passing said each event through each branch of a subtree of said child program object sequentially for each child program object of said root parent program object.

22. The system for correlating a plurality of events of claim 18, said system further comprising:

means for parsing said series of events into a uniform event format utilized by said plurality of program objects within said network prior to said evaluation.

23. The system for correlating a plurality of events of claim 18, wherein said series of events includes an indication of a detection of a particular hardware state within said data processing system.

24. The system for correlating a plurality of events of claim 18, said data processing system comprising a data communication network that includes a plurality of hardware components including a host computer, wherein said series of events is received at said host computer and at least one of said series of events indicates a detection of a particular hardware state of a remote hardware component of said data communication network.

25. The system for correlating a plurality of events of claim 18, wherein said series of events includes an indication of a failure of a previously invoked action.

26. The system for correlating a plurality of events of claim 18, wherein said means for invoking an action comprises means for invoking a plurality of actions at one or more of said plurality of program objects within one of said plurality of rule networks.

27. The system for correlating a plurality of events of claim 18, said data processing system further including an action server, said system further comprising:

means, responsive to said invocation of an action at one of said plurality of program objects, for performing said action utilizing said action server if said program object specifies that said action is to be performed in parallel with said evaluation of said series of events within said each rule network associated with said at least one registered application program.

* * * * *